(12) United States Patent
Winton, III

(10) Patent No.: US 6,722,050 B2
(45) Date of Patent: Apr. 20, 2004

(54) BEND-ANGLE MEASURING DEVICE

(75) Inventor: George R. Winton, III, Lawrenceville, GA (US)

(73) Assignee: Winton Machine Co., Suwanee, GA (US)

( * ) Notice: Subject to any disclaimer, the term of this patent is extended or adjusted under 35 U.S.C. 154(b) by 0 days.

(21) Appl. No.: 10/087,796

(22) Filed: Mar. 5, 2002

(65) Prior Publication Data

US 2003/0167648 A1 Sep. 11, 2003

(51) Int. Cl.[7] .................................................. G01B 3/56
(52) U.S. Cl. ........................................... 33/534; 33/473
(58) Field of Search .......................... 33/534, 1 N, 452, 33/453, 464, 465, 468, 470, 471, 473, 538

(56) References Cited

U.S. PATENT DOCUMENTS

| 1,533,097 | A | * | 4/1925 | Byhre | 33/473 |
| 5,446,969 | A | * | 9/1995 | Terenzoni | 33/464 |
| 5,603,236 | A | * | 2/1997 | Hongo | 33/1 N |
| 6,289,598 | B1 | * | 9/2001 | Tanabe | 33/465 |
| 6,460,263 | B1 | * | 10/2002 | Matsumoto | 33/534 |

* cited by examiner

*Primary Examiner*—Christopher W. Fulton
(74) *Attorney, Agent, or Firm*—Staas & Halsey LLP

(57) ABSTRACT

A bend-angle measuring device used to measure the bend angle of bent tubular components. The bend-angle measuring device makes use of a combined linear and rotational motion of a movable arm to gain access to numerous bent configurations.

4 Claims, 4 Drawing Sheets

BEND-ANGLE MEASURING DEVICE

BACKGROUND-FIELD OF INVENTION

The present invention relates to an inspection device to measure the bend angle of a formed component. The inventive machine uses a combined linear and rotational motion to measure numerous formed configurations.

BACKGROUND-DESCRIPTION OF THE RELATED ART

Over the past years, manufacturers of bent tubular components have had a need to measure the bend angles produced on various bending machines. This is necessary for quality control. Good quality control can lead to good parts produced. The bend angle of a fabricated bent part is most often a critical aspect of a manufacturing process. Over the years, bend angles have been measured using many devices including dedicated fixtures, digital protractors, various four-bar linkages coupled to digital readouts, and optical techniques.

Dedicated fixtures are quick and accurate yet do not lend themselves well to being useful for measuring other bent configurations. Because of their dedicated nature, a dedicated measuring device is designed to measure only one configuration and thus is not intended to measure numerous configurations.

Digital protractors are accurate and can measure numerous shapes, yet do not lend themselves well to measuring bend angles as the bend angle approaches 180°. This is due to the fact that the pivot point on a commercial digital protractor is unable to transverse in a linear fashion and thus the range of useful motion is limited when attempting to measure numerous bent configurations.

There have been several digital devices coupled with various four-bar linkage designs to overcome the above disadvantages. Four-bar linkage devices intended to measure most bend angles are flexible to accommodate numerous tubular configuration. Nevertheless, four-bar linkages, by design, are constructed from several moving parts. With several moving parts in an inspection device, the repeatability of such a device will be limited. This limitation is caused by the excessive number of moving parts in contact with each other. Interaction between moving parts produce friction, and friction in an inspection machine leads to results that are not accurate and repeatable over time.

Optical techniques, as disclosed by Brinkman, et al., U.S. Pat. No. 6,268,912, require a vast amount of software and electronics to operate. These techniques are intended for the high end of the inspection market and do not address a low cost solution.

SUMMARY OF THE INVENTION

Accordingly, several objects and advantages of my invention are:
(a) to reduce the number of components in a bend-angle measuring machine;
(b) to market a digital bend-angle measuring machine at a low cost;
(c) to provide a bend-angle measuring machine that will quickly adjust to numerous bend angle configurations; and
(d) to provide a simple mechanism, with few moving components, to minimize the amount of friction in the measuring system.

Still further objects and advantages will become apparent from a consideration of the ensuing description and drawings.

The foregoing and other objects and advantages can be achieved by providing a fixed arm and a movable arm connected to a common base. The fixed arm is fixed relative to the base and the movable arm is able to transverse in a linear and rotational fashion toward and away from the movable arm. Coupled to the rotational motion of the movable arm is a digital encoder. The encoder transmits the position of the rotational axis of the movable arm to a digital readout and thus displays the rotational position (angle) of the movable arm relative to the fixed arm.

DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENT

Figure 1:
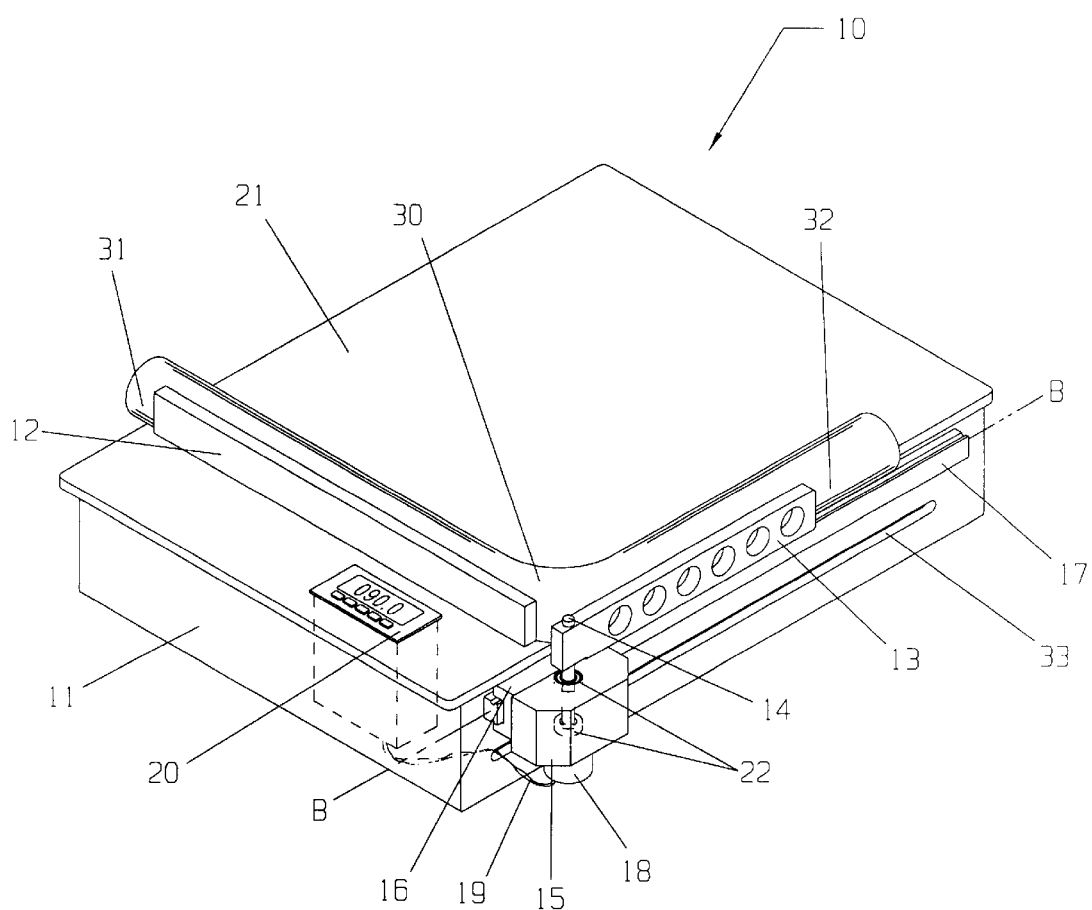
FIG. 1 shows an isometric view of an embodiment depicting the fixed and movable arms attached to the base.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

With initial reference to FIG. 1, a bend-angle measuring device 10 is shown. A base 11 is constructed from as solid material such as wood or metal. Attached to base 11 is a fixed arm 12. Fixed arm 12 is unable to move relative to base 11 and the two can be attached by common fasteners. Fixed arm 12 is supported by a top surface 21. Top surface 21 is the topmost surface of base 11 and is adjacent to fixed arm 12. Top plate 21 is mostly flat. Attached to base 11 is a linear rail 17. Linear rail 17 is attached to base 11 using common fasteners. Located on linear rail 17 is a linear bearing 16. Linear bearing 16 is able to slide along linear rail 17. Linear rail 17 is parallel to axis B—B shown in FIG. 1 and thus linear bearing 16 moves along axis B—B.

Linear bearing 16 may be of the type described by Teramachi in U.S. Pat. No. 4,040,679. In U.S. Pat. No. 4,040,679, Teramachi teaches about a linear bearing that employs recirculating ball bearings. The ball bearings recirculate in a track while the bearing block advances in a linear fashion along a linear rail. The grooves in the linear rail help capture the ball bearings as the ball bearings recirculate within the bearing block. This technique results in rolling friction as the linear bearing moves relative to the linear rail.

With reference to FIGS. 1, 2, 3, and 4, a block 15 is attached to linear bearing 16. Free to rotate about an axis A—A (See FIG. 4) is a shaft 14. Shaft 14, constructed from metal, is supported by roller bearings 22. Roller bearings 22 are supported by block 15. Attached to shaft 14 is movable arm 13. Attached to block 15 and shaft 14 is a digital encoder 18. Digital encoder 18 is powered by a low voltage electrical source and outputs electrical pulses that are proportional to the rotational displacement of shaft 14. Shaft 14 connects movable arm 13 to digital encoder 18 while shaft 14 rotates about axis A—A. From FIG. 1, digital encoder 18 is connected to a digital display 20 by a multi-conductor electrical cable 19. Multi-conductor electrical cable 19 is passed thru base 11 via a slot 33 connecting encoder 18 to digital display 20. The electrical pulses received by digital display 20 from digital encoder 18 are converted by digital display 20. The converted pulses allow a user to view the real-time bend angle in large numerals on digital display 20.

From FIG. 1, a bent tube 30, typically constructed from a hard material such as metal, is located above top surface 21 in preparation for inspection. Tangent to fixed arm 12 is tube 30 and more specifically the section of tube 30 in contact with fixed arm 12 is a tube leg 31 located on tube 30.

Tangent to movable arm 13 is tube 30 and more specifically the section of tube 30 in contact with movable arm 13 is a tube leg 32 located on tube 30.

Figure 2:
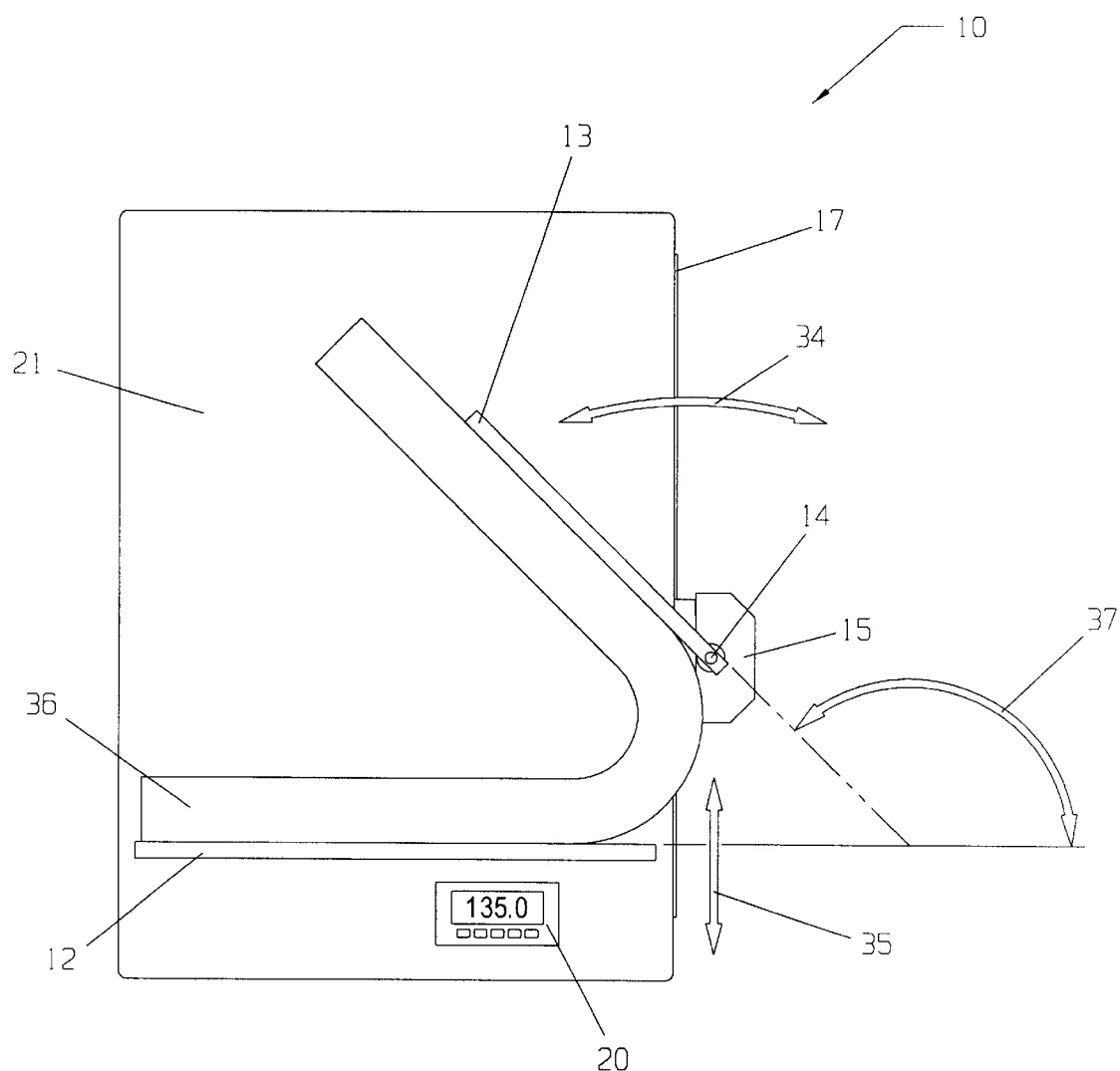
FIG. 2 shows a top view of the embodiment depicting both degrees of motion regarding the movable arm relative to the fixed arm and their relation to the top surface.

From FIG. 2, a rotational arrow 34 and a linear arrow 35 show the two motions available to movable arm 13. Linear bearing 16 travels along axis B—B which is in the same direction as linear arrow 35. Shaft 14 rotates in a plane defined by rotational arrow 34. Therefore movable arm 13 takes the rotational motion of rotational arrow 34 and the linear motion of linear arrow 35.

Figure 3:
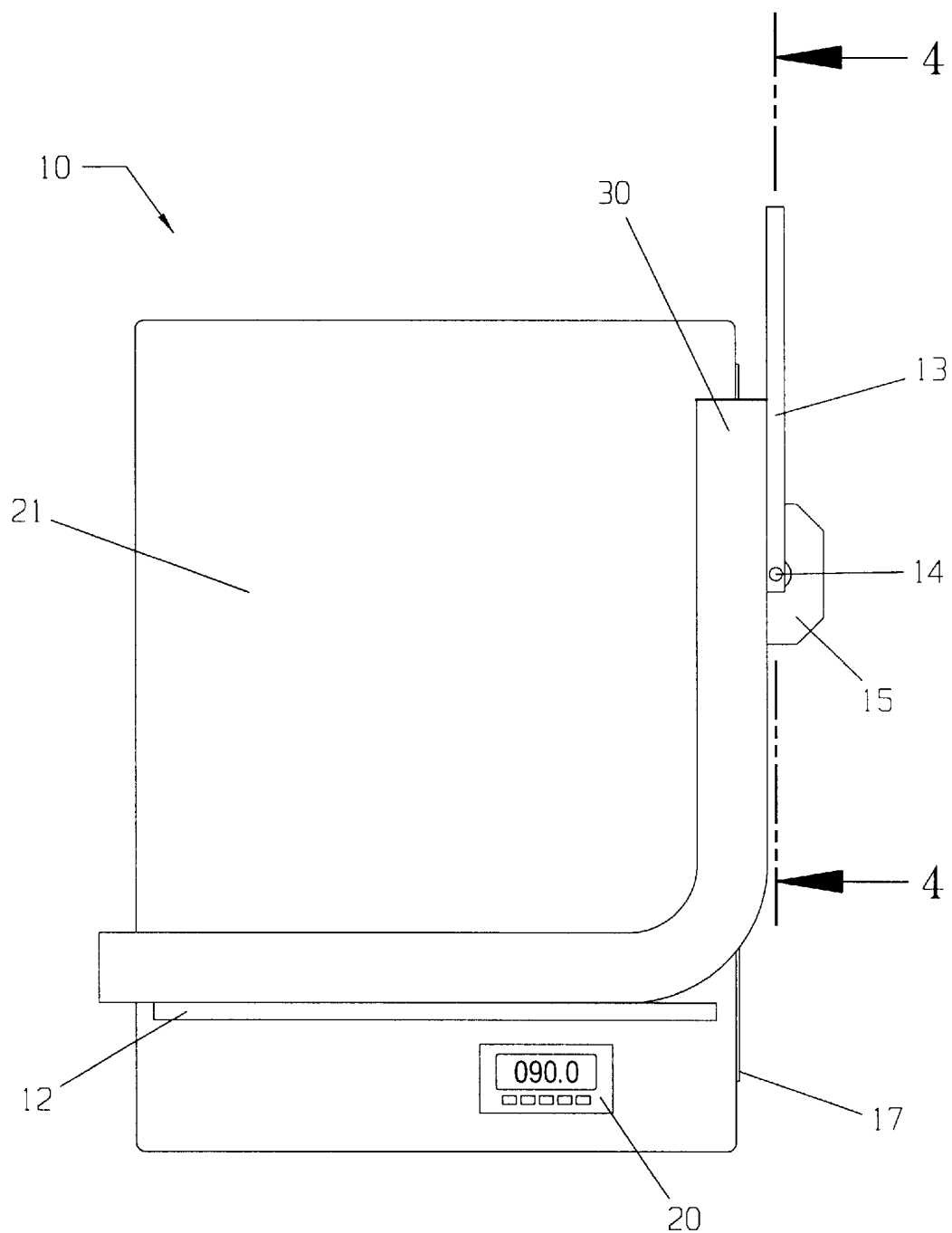
FIG. 3 shows a top view of the embodiment depicting the movable arm in a new rotational and linear position relative to the movable arm shown in FIG. 2.
Figure 4:
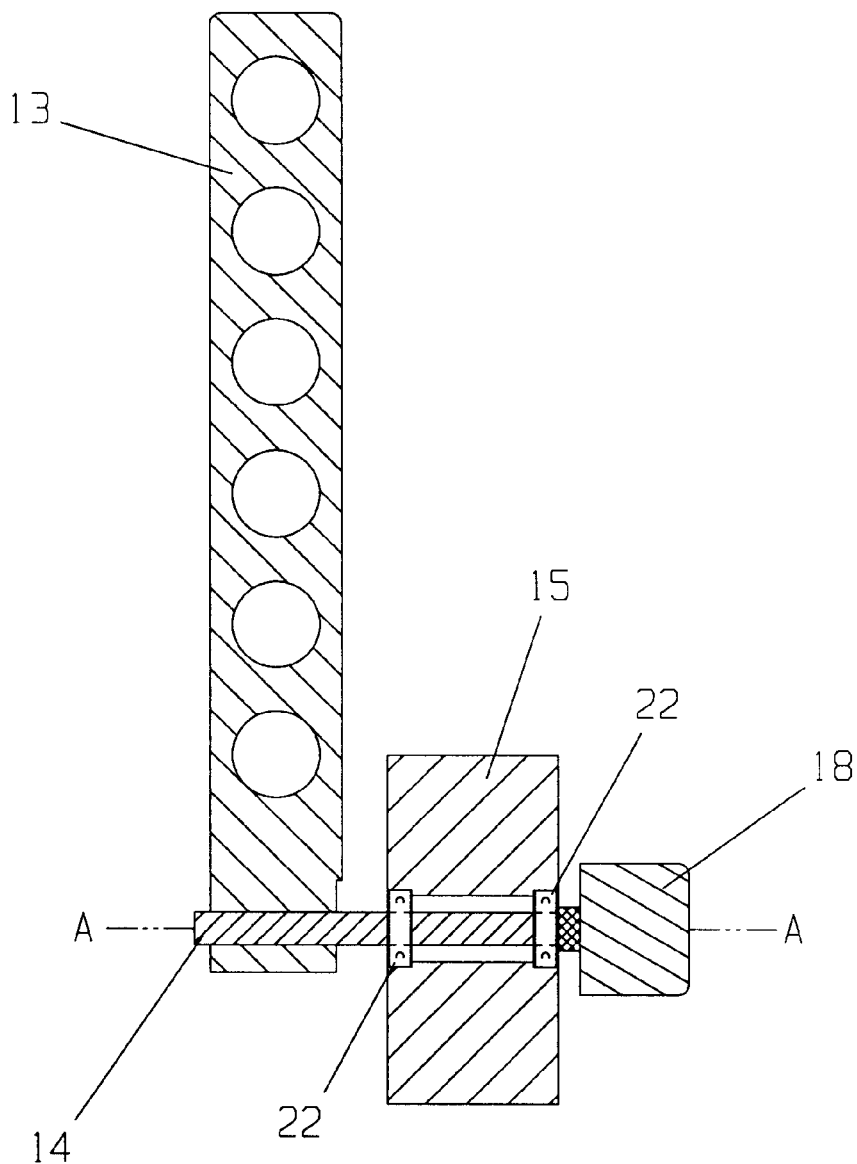
FIG. 4 shows a cutaway view of the movable arm assembly showing the relation between the movable arm and how it is coupled to the digital encoder.

From FIG. 2, a tube 36 is located on top surface 21. Tube 36 is formed at a greater bend angle than tube 30 as shown in FIG. 3. The position of movable arm 13 is adjusted differently for both bent configurations as shown in FIGS. 2 and 3.

From FIG. 2, a bend angle 37 defines the bend angle between fixed arm 12 and movable arm 13.

In operation, with reference to FIGS. 1 thru 4, tube 30 is placed on top surface 21. Tube leg 31 is placed adjacent to fixed arm 12. Once tube leg 31 is flush against fixed arm 12, movable arm 13 is moved into positioned by hand until tube leg 32 is adjacent to movable arm 13. An operator can then review the exact bend angle 37 by viewing digital display 20.

Movable arm 13 is able to move to numerous bend configuration via the combined rotational and linear motion of block 15 and shaft 14 as shown by rotational arrow 34 and linear arrow 35. Linear rail 17 along with linear bearing 16 and guide block 15 move in a precision linear fashion along axis B—B. Independent of the linear motion of block 15 is the rotational motion of shaft 14 about axis A—A. Bearings 22 guide shaft 14 about axis A—A and thus permit a precision rotational motion as movable arm 13 rotates about axis A—A.

As movable arm 13 rotates about axis A—A, digital encoder 18 outputs pulses proportional to the angular displacement of shaft 14 and thus the rotational position of movable arm 13 relative to fixed arm 12. Digital display 20 always shows the bend angle 37. The output of digital encoder 18 is transmitted via multi-conductor electrical cable 19 to digital display 20. Multi-conductor electrical cable 19 connects encoder 18 to digital display 20. As movable arm 13 rotates about axis A—A, its angular position (bend angle 37) is displayed via digital display 20.

Accordingly, the scope of the invention should be determined not by the embodiment illustrated, but by the appended claims and their legal equivalents.

What is claimed is:

1. An angle measuring device to determine a bend angle between first and second portions of a tube, the angle measuring device comprising:

a base to receive the tube;

a first arm fixed to the base in a first linear direction, to contact the first portion of the tube;

a second arm slidable relative to the first arm in a second linear direction perpendicular to the first linear direction and rotatable about an axis perpendicular to the first and second linear directions; and a rotation determining unit which determines a rotational displacement of the second arm about the axis;

wherein the second arm is moved in the second linear direction and rotated about the axis of rotation to be parallel to the second portion of the tube, and the rotation determining unit determines the bend angle based upon the determined rotational displacement.

2. The angle measuring device according to claim 1, wherein the rotation determining unit is an encoder.

3. The angle measuring device according to claim 1, further comprising:

a linear rail attached to said base; and a linear bearing attached to said linear rail;

wherein the second arm is mounted on the linear bearing to move in the second linear direction.

4. The angle measuring device according to claim 1, further comprising:

a linear rail attached to said base; and a linear bearing attached to said linear rail;

a block attached to said linear bearing;

a shaft attached to said block;

wherein the second arm is mounted on the shaft to move in the second linear direction, and the rotation determining unit is an encoder;

a display; and an electrical cable connecting said encoder to said display, the electrical cable transmitting the determined bend angle from said encoder to said display.

* * * * *